United States Patent [19]
Nakahira et al.

[11] Patent Number: 5,916,478
[45] Date of Patent: Jun. 29, 1999

[54] HEAT-ACCUMULATING MICROCAPSULE DISPERSION

[75] Inventors: Takatoshi Nakahira; Tetsuo Setoguchi; Masaaki Yoshikawa; Akira Kishimoto; Akio Chikazawa, all of Osaka; Mamoru Ishiguro, Tokyo; Yasunori Nakanishi, Nishinomiya; Shigehiro Maeda, Tokyo; Yukihiko Akamatsu, Hirakata, all of Japan

[73] Assignee: Osaka Gas Co, Ltd, Japan

[21] Appl. No.: 08/771,025

[22] Filed: Dec. 20, 1996

[30] Foreign Application Priority Data

Dec. 22, 1995 [JP] Japan ..................................... 7-334835
Feb. 14, 1996 [JP] Japan ..................................... 8-026543

[51] Int. Cl.⁶ .............................. C09K 5/06; B01J 13/18
[52] U.S. Cl. ................. 252/73; 165/104.17; 165/104.21; 252/70; 252/76; 427/213.34; 428/402.21; 428/402.24
[58] Field of Search ................................. 252/73, 76, 70; 428/402.21, 402.24; 427/213.34; 430/138; 165/104.17, 104.21

[56] References Cited

U.S. PATENT DOCUMENTS

| | | | |
|---|---|---|---|
| 4,504,402 | 3/1985 | Chen et al. | 252/70 |
| 4,708,812 | 11/1987 | Hatfield | 252/70 |
| 4,911,232 | 3/1990 | Colvin et al. | 165/104.17 |
| 5,456,852 | 10/1995 | Isiguro | 252/70 |

*Primary Examiner*—Richard D. Lovering
*Attorney, Agent, or Firm*—Fulbright & Jaworski, LLP.

[57] ABSTRACT

Heat-accumulating microcapsule dispersion includes a microcapsule provided as a small-diameter heat-accumulating material including organic compound functioning as heat accumulating material in association with a phase change thereof accommodated within a microcapsule, heat transfer fluid medium including a number of the microcapsules dispersed stably therein, and a number of thermal boundary layer stirring particles dispersed in the heat transfer fluid medium. The stirring particles has a volume average particle diameter between 0.1×D and 1.9×D relative to a layer thickness D of a thermal boundary layer formed inside a heat exchanging passage through which the dispersion is caused to flow. The particles stir the thermal boundary layer in association with movement thereof inside the heat exchanging passage.

19 Claims, 4 Drawing Sheets

HEAT-ACCUMULATING MICROCAPSULE DISPERSION

BACKGROUND OF THE INVENTION

1. Field of the Invention

The present invention relates to heat-accumulating microcapsule dispersion, and more particularly to a microcapsule dispersion including, in a stably dispersed state in heat transfer fluid medium, a number of heat-accumulating microcapsules each having a microcapsule shell accommodating therein organic compound functioning a heat accumulating material in association with a phase change thereof. The heat-accumulating microcapsule dispersion may be used as heat transfer medium employed in e.g. an air-conditioning system such as a local area air-heating system or an indoor air-cooling system.

2. Description of the Related Art

There is known heat-accumulating microcapsule dispersion of the above-noted type including, in a stably dispersed state in water, a number of heat-accumulating microcapsules made of e.g. melamine resin having microcapsule shell accommodating therein heat-accumulating material such as tetradecane, paraffin wax or the like.

For manufacturing such heat-accumulating microcapsule dispersion as above, the heat-accumulating material and prepolymer of melamine resin are polymerized with each other while being dispersed and emulsified in water. As a result, there is obtained the dispersion in which heat-accumulating microcapsules each having a core formed mainly of the heat-accumulating material covered with a capsule outer layer microcapsule shell of the resin coating are dispersed in a stable manner in the water.

The heat-accumulating microcapsule dispersion of the above-noted type has a greater viscosity than e.g. water alone, because the dispersion includes the microcapsules dispersed therein. And, this viscosity tends to increase with use of the dispersion.

On the other hand, as for the heat-accumulating capacity, the dispersion has a higher capacity than the heat transfer fluid medium alone. Then, in order to obtain a certain fixed amount of heat transfer capacity, this is possible simply by circulating a smaller amount of dispersion in a circulating passage provided between a heat receiving end and a heat supplying end. That is, even if the diameter of the pipe constituting this passage is reduced, the same amount of heat transfer capacity may be obtained.

As shown in FIG. 2, the heat-accumulating microcapsule dispersion described above is responsible for transferring heat between a heat-receiving end heat exchanger and a heat-supplying end heat exchanger. Then, in order to allow the heat exchange to take place efficiently, one will encounter the problem of the heat transfer performance between the dispersion and the inner wall of the passage constituting the heat exchanging passage in which the dispersion runs.

In general, the heat transfer rate under such environment as above is a function of the Reynolds number which represents flow conditions of fluids. A smaller Reynolds number results in lower heat transfer rate.

The above will be described more specifically with reference to FIG. 6. In this FIG. 6, the horizontal axis represents the Reynolds number: Re of the dispersion flow, while the vertical axis represents the heat transfer rate: hi between the passage wall and the dispersion. An alternate long and short dashed line indicates the relationship between the Reynolds number: Re of water conventionally employed and the heat transfer rate: hi. A white round dot chain line indicates the relationship for the conventional dispersion including the conventional heat-accumulating microcapsules (the microcapsule has a volume average particle diameter smaller than 5 $\mu$m and exhibits a particle distribution pattern as depicted in FIG. 4) dispersed in water.

Referring further to the same figure, the mark: Reynolds (near 10000), denotes a typical Reynolds number obtained with a system operation using water alone as the operational medium. The further mark: Renew (near 1250), denotes a typical Reynolds number obtained with a system operation using dispersion including microcapsules dispersed therein in a stable manner.

As may be understood from this FIG. 6, in the case of the use of water alone or the conventional microcapsule, the heat transfer rate decreases with decrease in the Reynolds number. The heat transfer rate: hiold, of the case using water alone at Reold, is significantly higher than the heat transfer ratio: hinew of the case using the conventional microcapsule dispersed at Renew. In this respect, there is room for improvement.

That is to say, in case the heat-accumulating capsule is used as being stably dispersed in the heat transfer fluid medium in order to secure a certain heat transfer amount, it is desired to increase the heat transfer rate between this dispersion and the wall of the heat exchanging passage through which the dispersion is caused to flow.

Accordingly, in view of the above-described drawbacks of the conventional art, a primary object of the present invention is to obtain heat-accumulating microcapsule dispersion which can provide a higher heat transfer rate between this dispersion and the member constituting the passage through which the dispersion is caused to flow.

SUMMARY OF THE INVENTION

For accomplishing the above-noted object, heat-accumulating microcapsule dispersion, according to the present invention, comprises:

a microcapsule provided as a small-diameter heat-accumulating material including organic compound functioning as heat accumulating material in association with a phase change thereof accommodated within a microcapsule; heat transfer fluid medium including a number of the microcapsules dispersed stably therein; and a number of thermal boundary layer stirring particles dispersed in the heat transfer fluid medium, the particles having a volume average particle diameter between 0.1×D and 1.9×D relative to a layer thickness D of a thermal boundary layer formed inside a heat exchanging passage through which the dispersion is caused to flow, the particles, stirring the thermal boundary layer in association with movement thereof inside the heat exchanging passage.

The heat-accumulating microcapsule dispersion, under operation, is used within a range lower than the critical Reynolds number. In such case, when the dispersion flows within the heat exchanging passage, there is formed a thermal boundary layer of a relatively large thickness, adjacent the inner wall surface of the passage.

In the heat transfer described above, the thermal boundary layer determines the rate of this heat transfer. Accordingly, if the heat transfer rate is to be improved, as the object of the present invention, it is effective to stir the fluid present within this thermal boundary layer.

Hence, in the heat-accumulating microcapsule dispersion according to the present invention, there are dispersed the thermal boundary layer stirring particles having a volume average particle diameter within a predetermined range in correlation with the thickness of the thermal boundary layer. Then, as the thermal boundary stirring particles stir the thermal boundary layer formed adjacent the wall surface of the heat exchanging passage, a higher heat transfer rate may be secured. As a result, in the case of employing heat-accumulating microcapsules, the dispersion containing these capsules may be more useful for the applications.

In the above, if the volume average particle diameter is greater than the above-defined range, there tends to occur the problem of in the dispersion. Conversely, if the diameter is smaller than the range, there tends to occur deterioration in the stirring effect.

According to one aspect of the present invention, the small-diameter heat-accumulating microcapsule has a volume average particle diameter ranging between 1 and 5 $\mu$m; whereas, the volume average particle diameter of the thermal boundary stirring particle ranges not smaller than 5 $\mu$m and smaller than 100 $\mu$m.

As the small-diameter heat-accumulating microcapsules described above, material having a smaller specific weight than water, such as aliphatic hydrocarbon compounds, is often employed as its heat accumulating material. Therefore, if the volume average particle diameter of this microcapsule is greater than the predetermined range, there tends to occur separation between the microcapsule and the transfer fluid medium. For this reason, by limiting the volume average particle diameter of the heat-accumulating microcapsule within the predetermined range (i.e. 1 to 5 $\mu$m), even if the heat-accumulating microcapsules alone are to be dispersed in the transfer fluid medium, this dispersion may be effected stably. In this respect, if the volume average particle diameter is greater than 5 $\mu$m, the dispersion will tend to be uneven. Conversely, if the diameter is not greater than 1 $\mu$m, the manufacture of the microcapsule will become difficult and also its heat transfer capacity will be lower.

On the other hand, under a normal operation condition using the heat-accumulating microcapsule described above, in order to be able to stir the thermal boundary layer in the dispersion flow, the particle diameter should be not smaller than 5 $\mu$m and smaller than 100 $\mu$m (more preferably between 10 and 100 $\mu$m). Accordingly, thermal boundary layer stirring particles having a volume average particle diameter corresponding to the above range will be separately dispersed in the dispersion. Then, as the thermal boundary layer stirring particles having the above-specified volume average particle diameter effectively stir the thermal boundary layer, the heat transfer rate may be improved. As a result, there has been achieved a more useful dispersion using heat-accumulating microcapsule.

Preferably, in the heat-accumulating microcapsule dispersion described above, the thermal boundary layer stirring particles comprise large-diameter heat-accumulating microcapsules each having a microcapsule accommodating therein an organic compound functioning as heat accumulating material in association with a phase change thereof.

In this case, the thermal boundary layer stirring particle obtains the heat-accumulating ability in addition to the thermal boundary layer stirring ability. Thus, the heat-accumulating microcapsule dispersion using this particle may obtain a greater heat-accumulating ability as well as relative high heat transfer rate, in comparison with the conventional art.

Preferably, in the above construction, the small-diameter heat-accumulating microcapsules and the large-diameter heat-accumulating microcapsules are mixed in a ratio between 49:1 to 1:1.

This mixing ratio is suitable for achieving stable dispersion of the small-diameter heat-accumulating microcapsules in the transfer fluid medium, and also stable dispersion of the large-diameter heat-accumulating microcapsules therein. As a result, there may be obtained heat-accumulating microcapsule dispersion having the advantageous property of the microcapsules being hardly separated from the transfer fluid medium.

In the above, if the amount of the large-diameter heat-accumulating microcapsules is greater than the above-specified mixing ratio range, the separation will more likely occur. Conversely, if the amount is smaller than the range, it will become difficult to increase the heat transfer rate.

In the case of the thermal boundary layer stirring particles described hereinbefore, the particles are provided in the form of microcapsules. However, for the purpose of achieving a higher heat transfer rate and also heat-accumulating ability as good as or better than the conventional dispersion, these particles need not be microcapsules. The particles may achieve the expected performance improvement as long as they have the essential effect of stirring the thermal boundary layer.

Then, in accordance with the above-described object, the thermal boundary layer stirring particles preferably comprise one or more kinds selected from the group consisting of melamine resin particles, urea resin particles, polyethylene particles, carbon powder, and wheat flour.

In the above case too, these particle or powdery materials may effectively stir the thermal boundary layer, thus achieving improvement in the heat transfer rate, consequently increase in the amount of heat transferred.

In the above-described constructions, the organic compound functioning as heat accumulating material in association with a phase change thereof, preferably comprises aliphatic hydrocarbon compound.

In the above case, as the substance subjected to a phase change is used as the heat-accumulating material, it is possible to obtain a high heat accumulating capacity per unit volume. Further, as no significant temperature difference is developed despite the large heat accumulating capacity, heat loss may be restricted advantageously. Further, in the case of using the aliphatic hydrocarbon compound, it is possible to obtain heat-accumulating microcapsule dispersion having stable property, by using widely and inexpensively available material.

Preferably, the aliphatic hydrocarbon compound comprises mixture of hexadecane and pentadecane.

In general, when two kinds of heat-accumulating materials are mixed together, the resultant mixture hardly obtains intermediate heat properties between the two. Rather, the mixture will result in decrease in the melting point and solidifying point and further in the amount of melting heat. It may be said, therefore, that it is difficult to satisfy all the requirements and that such mixture generally affects the thermal property adversely. In spite of this, it has been found that the above-described combination of two kinds is special in that the combination does not result in decrease in the melting or solidifying point nor significant reduction in the amount of melting heat. On the other hand, other combinations of hexadecane and tetradecane or combinations of pentadecane and a compound other than the aliphatic hydrocarbon, for instance, will provide no advantage of mixing at all, as these combinations merely result in significant decrease in the solidifying point, significant reduction in the amount of melting heat, or broadening of the phase-change temperature range.

In order to accumulate a melting and solidifying heat amount greater than 30 kcal/kg per unit absolute dry weight of the capsule within the above temperature range, the mixing ratio between hexadecane and pentadecane preferably ranges between 8:2 and 1:9, more preferably between 7:3 and 2:8. If the amount of hexadecane is greater than the above ratio, then, the melting point of the mixture will rise beyond the desirable temperature range. On the other hand, if the amount of pentadecane is greater than the above ratio, then, excessive drop in the solidifying point, reduction in the melting heat will occur in the mixture, and again disadvantageous deviation from the desirable temperature range will occur.

As the method employed by the present invention for encapsulating into the microcapsules the compound subjected to phase change, it is possible to employ such methods as coacervation, surface polymerization, in-situ method, or method utilizing yeasts (see Japanese laid-open patent gazette No. 63-88033 for example). The effect of the invention may be achieved by using any one of these methods.

The particle diameter of the microcapsule is adjusted by selection of the machines, such as an emulsifier or disperser, capable of applying a large shearing force in order to obtain a predetermined particle diameter, or selection of the temperature and time period used for the emulsifying dispersion. Preferably, the particle diameter is between 0.1 and 5 $\mu$m. If the particle diameter exceeds 5 $\mu$m, the microcapsule will tend to be subjected to a shearing force during the flowing movement thereof and be destroyed by the force. Conversely, in order to obtain a particle diameter not greater than 0.1 $\mu$m, a considerable amount of time is needed for the emulsifying dispersion. And also, such excessively small particle diameter may result in significant increase in the viscosity. For these reasons, it is preferred that the lower limit be greater than 0.1 $\mu$m.

The heat-accumulating mixture material used in the present invention may additionally include de-supercooling material. With this, it is possible to avoid the phenomenon of the melting point and solidifying point being different from each other, i.e. supercooling phenomenon. As a result, there is obtained heat-accumulating composition which melts and solidifies repeatedly within a further narrower temperature range.

As the de-supercooling material to be employed, a compound having a melting point of 40° C. or higher is suitable, e.g. carboxylic acids such as stearic acid, palmitic acid, or alcohols such as stearyl alcohol, octane diol, amides such as ethylenebisamide, stearic acid amide.

Preferably, the de-supercooling material is added within a range of 0.1 to 20% (w/w) relative to the weight of the heat-accumulating material. If the amount is less than the above range, effect of the de-supercooling material will be insufficient. Conversely, if the amount is more than the above range, this will lead to reduction in the melting heat amount.

The cold heat transferring microcapsule dispersion of the present invention obtained in the above-described manner may sufficiently achieve the object of the invention even when the dispersion alone is employed. However, depending on the necessity, to this dispersion, such materials may be added, as ethyleneglycol, propyleneglycol, various kinds of inorganic salts, various kinds of antiseptic agents, thickeners, dispersion adjuvants, specific-gravity adjusting agents, wetting agents, aggregate, water treating agents, fluidity adjusting agents, various inorganic or organic pigments or dyes.

Further and other objects, features and effects of the invention will become more apparent from the following more detailed description of the embodiments of the invention with reference to the accompanying drawings.

DETAILED DESCRIPTION OF THE PREFERRED EMBODIMENTS

Preferred embodiments of heat-accumulating microcapsule dispersion relating to the present invention will now be described in details with reference to the accompanying drawings.

Figure 1:
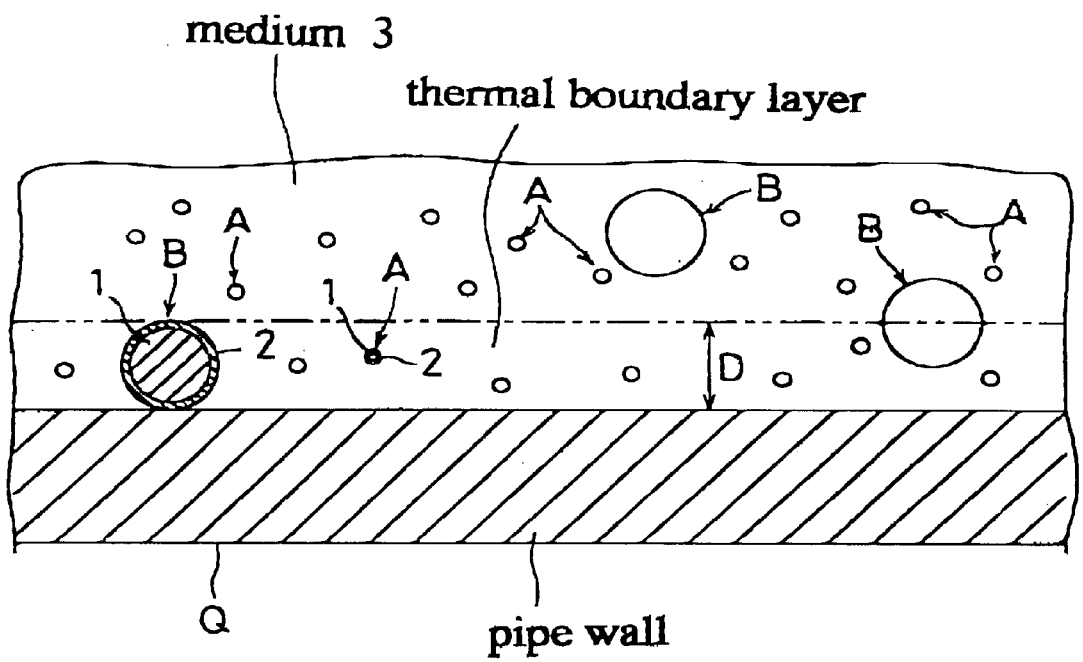
FIG. 1 is a conceptual view of heat-accumulating microcapsule dispersion.

As shown in FIG. 1, this heat-accumulating microcapsule dispersion includes, in a stably dispersed state in heat transfer fluid medium 3, a number of small-diameter heat-accumulating microcapsules each having a microcapsule shell 2 accommodating therein organic compound 1 functioning as heat accumulating material in association with a phase change thereof.

In the dispersion, in addition to the small-diameter heat-accumulating microcapsules A described above, a number of thermal boundary layer stirring particles B are also dispersed.

Here, the small-diameter heat-accumulating microcapsule A has a volume average particle diameter of about 1 to 5 $\mu$m; whereas, the thermal boundary layer stirring particle B has a volume average particle diameter not smaller than 5 $\mu$m and smaller than 100 $\mu$m (more preferably between 10 and 100 $\mu$m). Further, this thermal boundary layer stirring particle B may be constructed in two different manners. Namely, in the case of the first type, these particle B are provided in the form of another heat-accumulating microcapsule like the small-diameter heat-accumulating microcapsules A described hereinbefore. In the case of the second type construction, these particles B are provided in the form of mono-phase particles ('dummy' particle) having a predetermined particle diameter distribution pattern.

Next, the respective components of the dispersion will be more particularly described.

Organic compound I as the heat-accumulating material is made of: straight chain paraffins (aliphatic group hydrocarbon compounds) such as pentadecane, hexadecane, tetradecane or the like; aromatic group hydrocarbon compounds (benzene, p-xylene or the like); fatty acids (straight chain carboxylic acids such as nonane acids, or decane acids, alone or in combination thereof); and organic compound such as ester compound alone or in combination thereof.

The microcapsule shell 2 is made of capsule forming material, such as condensation polymer of e.g. melamine resin, urea resin, phenol resin, nylon or acrylic polymer of e.g. polystyrene, polymethylmethacrylate.

The mono-phase particle (dummy particle) is made of e.g. melamine resin particle, urea resin particle, polystyrene particle, polyethylene particle, carbon particle, wheat flour and so on. Further, this dummy particle may be provided in the form of microcapsule having no heat-accumulating capacity. Also, preferably, in order to secure stable dispersion, the specific weight of the mono-phase particle should be substantially equal to that of the liquid medium in which the particle is dispersed.

Further, the transfer fluid medium 3 is made of e.g. water, as described hereinbefore. In this case, depending on the necessity, the medium may be added with ethylene glycol, propylene glycol, various kinds of inorganic salts, antiseptic agents, various kinds of anti-deterioration agents, dispersion adjuvants, specific-gravity adjusting agents, wetting agents, and so on.

Next, referring to the ratios of the above-described components, preferably, the ratio of the dispersed particles (i.e. the sum of the small-diameter heat-accumulating microcapsules A and the thermal boundary layer stirring particles B) present in the entire dispersion is 5–50 wt %, and more preferably 10–20 wt %.

Further, the ratio of the thermal boundary layer stirring particles B relative to the entire dispersion is preferably 0.1–20 wt %, and more preferably 1–10 wt %.

Now, if the thermal boundary layer stirring particle B are provided in the form of the large-diameter heat-accumulating microcapsules which are to be used in combination with the small-diameter heat-accumulating microcapsules, it is preferred that the ratio between the small-diameter heat-accumulating microcapsules and the large-diameter heat-accumulating microcapsules be 49:1 to 1:1 (weight ratio), and more preferably 10:1 to 5:1.

As described above, in case the thermal boundary layer stirring particles B are provided in the form of heat-accumulating microcapsules, the particle diameter distribution of the heat-accumulating microcapsules A and B combined as a whole, should have a first particle diameter peak within the range of 1 to 5 $\mu$m and a second particle diameter peak within the further range of not smaller than 5 $\mu$m and smaller than 100 $\mu$m (more preferably, 10 to 100 $\mu$m). Further, the peak height of the second particle diameter peak should not substantially exceed that of the first particle diameter peak.

The easiest method to obtain the particle diameter distribution described above is to mix one kind of particles having the volume average particle diameter within the range of 1–5 $\mu$m and another kind of particles having the volume average particle diameter within the further range of not smaller than 5 $\mu$m and smaller than than 100 $\mu$m. Further, the particle diameter distribution respectively of the two kinds of particles together constituting the mixture should be such that in each distribution the frequency of the particle diameter should decrease in a monotonous manner as the particle diameter deviates from the volume average particle diameter.

In order to obtain the particle diameter distribution described above, it is preferred that the mixture comprise the small-diameter particles having the volume average particle diameter ranging at 1 to 5 $\mu$m and containing particles of particle diameters smaller than 10 $\mu$m at more than 70% and the large-diameter particles having the volume average particle diameter ranging greater than 5 $\mu$m and smaller than 100 $\mu$m (more preferably, at 10 to 100 $\mu$m) and containing particles of particle diameters greater than 10 $\mu$m at more than 70%. Further, it is preferred that the mixing ratio between the small-diameter particles and the large-diameter particles be greater than 2:8.

Now, the 'volume average particle diameter' referred to above, denotes an average particle diameter of volume-converted values of the microcapsules. In principle, the microcapsules are sorted into groups of different particle diameters according to the incrementing order of the diameter. Then, the volume average particle diameter comprises the particle diameter value obtained when 50 volume % of the particles have been sorted. Although the measurement of the volume particle diameter is possible by actually observing the particles with a microscope, the measurement is more easily possible in an automatic manner by using a commonly available electric or optical particle-diameter measuring apparatus. In the present embodiment, this measurement of the volume average particle diameter was made by using "COULTER MULTI SIZER" (manufactured by COULTERELECTRONICS LIMITED. Britain, aperture size: 50 $\mu$m).

The heat-accumulating microcapsule dispersion having the above-described composition and construction provides a higher heat transfer rate than the conventional dispersion including the small-diameter heat-accumulating microcapsules A alone described above.

Next, the applications of the heat-accumulating microcapsule dispersion will be described.

The microcapsule dispersion may be used as heat transfer medium employed in an air-conditioning system using an absorption or compression type refrigerator, so that the accumulated-heat releasing function of the heat transfer medium will be used for e.g. cooling in air in an office building for instance.

Figure 2:
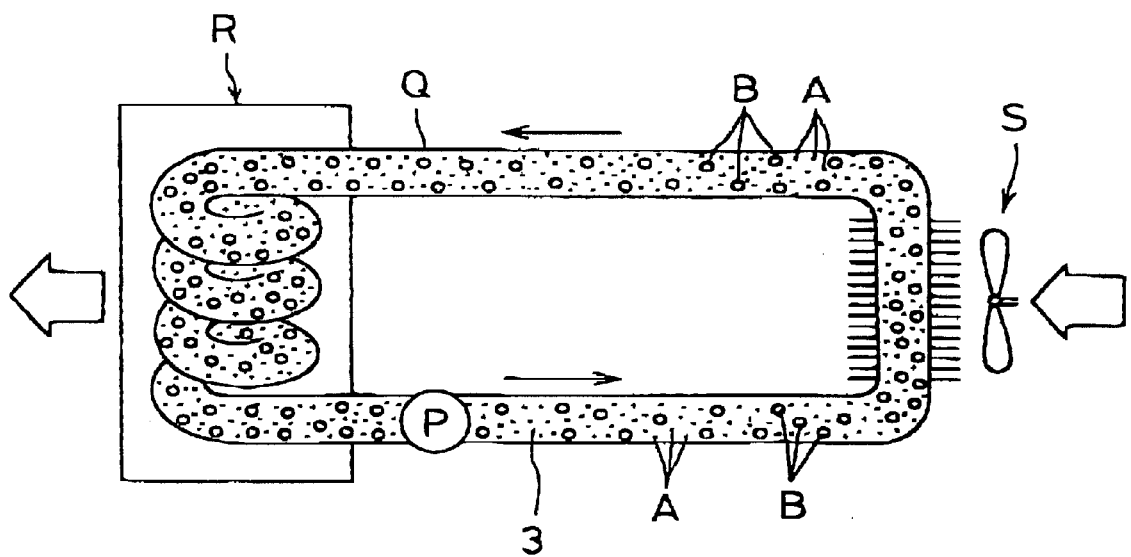
FIG. 2 is a conceptual view of an absorption type air-conditioning system.

More specifically, in the case of such air-conditioning system shown in FIG. 2, a circulating passage formed of a piping Q is provided between an evaporator R disposed outdoors and a cooling device S disposed indoors. And, a circulating pump P generates circulation of the heat-accumulating microcapsule dispersion contained with the piping Q. Accordingly, the dispersion transfers the cold heat generated at the outdoor device R to the indoor cooling device S and exhaust heat from the indoor is guided to the outdoor device R to be discharged therefrom to the outdoor.

Next, specific embodiments of the heat-accumulating microcapsule dispersion will be described.

In these respective embodiments, the small-diameter capsule dispersion including the small-diameter heat-accumulating microcapsules A stably dispersed therein is mixed with the large-diameter capsule dispersion at the predetermined mixing ratio. Alternatively, the mono-phase particles (i.e. the 'dummy' particles) are mixed and dispersed in the small-diameter capsule dispersion.

The small-diameter capsule dispersion corresponds to the conventional dispersion.

Next, the manufacturing processes of the small-diameter capsule dispersion, the large-diameter capsule dispersion and the dispersion according to the present invention will be specifically described.

(1) Manufacture of the Small-Diameter Capsule Dispersion

Figure 4:
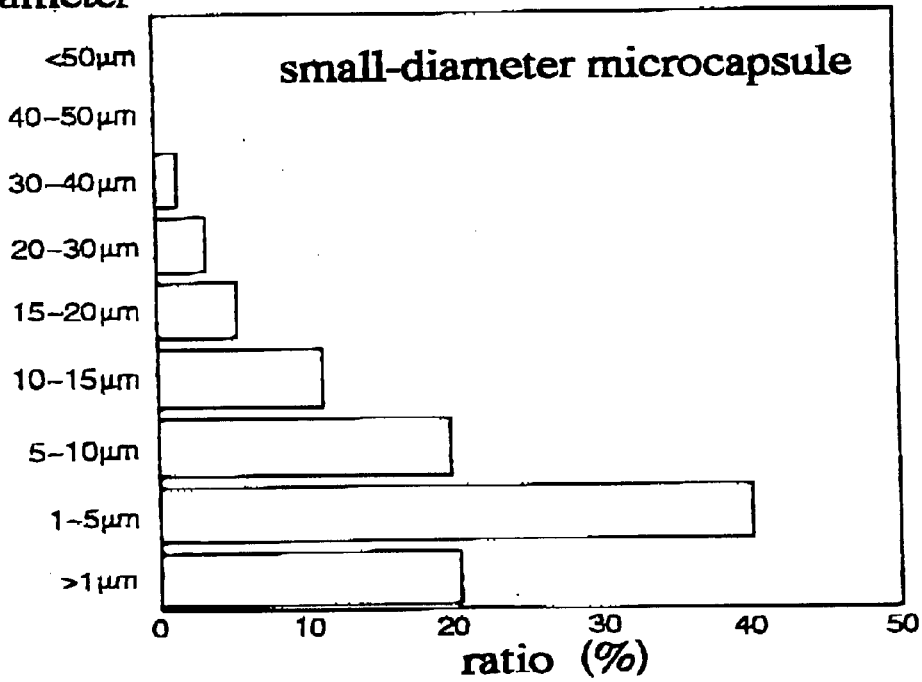
FIG. 4 is a graph showing particle diameter distribution of heat-accumulating microcapsules in a small-diameter capsule dispersion.

To 5 g of melamine powder, 6.5 g of 37% aqueous solution of formaldehyde and 10 g of water were added to adjust pH to 8. Then, the resultant mixture solution was heated to about 70° C., whereby initial condensation aqueous solution of melamine-formaldehyde was obtained. Separately, to 100 g of sodium salt aqueous solution of 5% styrene-maleic anhydride copolymer adjusted to pH 4.5, 80 g of n-pentadecane, as an organic compound subjected to a phase change, was added under violent stirring, thereby to effect emulsification until the volume average particle diameter of 1 to 5 μm was obtained. To this emulsified liquid, the entire mount of the above-described initial condensation aqueous solution of melamine-formaldehyde was added and stirred together at 70° C. for 2 hours. Then, the mixture was adjusted to pH 9, to complete the encapsulating process. The particle diameter distribution of the resultant dispersion is shown in FIG. 4.

(2) Manufacture of the Large-Diameter Capsule Dispersion

Figure 5:
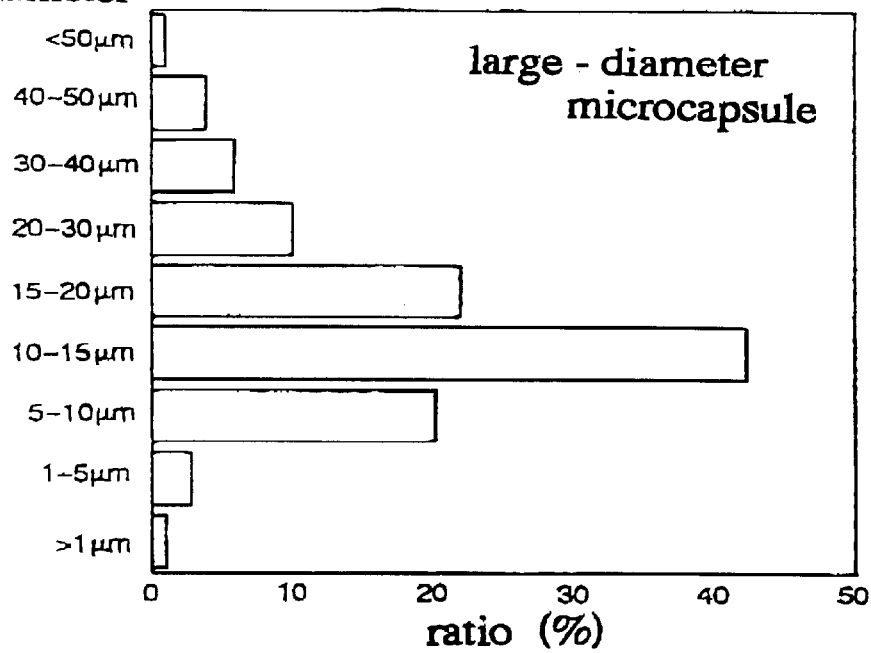
FIG. 5 is a graph showing particle diameter distribution of heat-accumulating microcapsules in a large-diameter capsule dispersion.

By using similar materials and processes for manufacturing the small-diameter capsule dispersion described above, dispersion having the volume average particle diameter of 10 to 15 μm was obtained. The particle diameter distribution of this dispersion is shown in FIG. 5.

(3) First Embodiment

Figure 3:
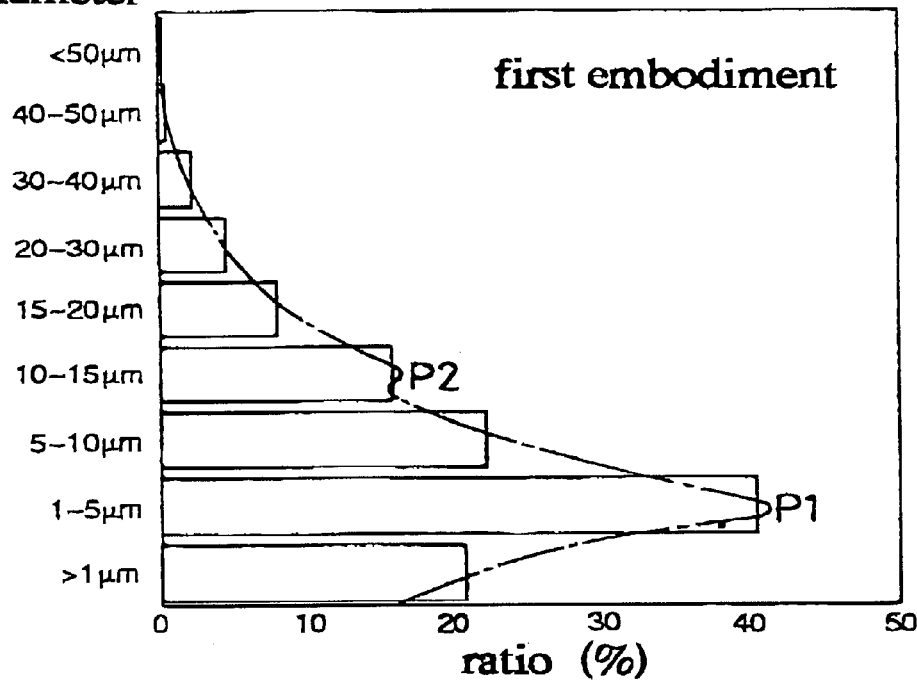
FIG. 3 is a graph showing particle diameter distribution of heat-accumulating microcapsules according to a first embodiment.

The large-diameter capsule dispersion and the small-diameter capsule dispersion described above were mixed at 1:9, thereby to obtain a first heat-accumulating microcapsule dispersion. The particle diameter distribution of this dispersion is shown in FIG. 3. In this figure, it may be seen that the distribution includes a first particle-diameter peak P1 and a second particle-diameter peak P2 and that the second particle-diameter peak P2 is lower than the first particle-diameter peak. It was confirmed that this dispersion was under a stable dispersion condition.

(4) Second Embodiment

The large-diameter capsule dispersion and the small-diameter capsule dispersion described above were mixed at 2:8, thereby to obtain a second heat-accumulating microcapsule dispersion. It was confirmed that this dispersion was under a stable dispersion condition.

(5) Third Embodiment

To the small-diameter capsule dispersion, melamine resin particles having the volume average particle diameter of 30 μm, as dummy particles, were mixed at 4 wt % relative to the weight of the entire dispersion mixture, thereby to obtain a third heat-accumulating microcapsule dispersion. In this case too, the dummy particles were dispersed stably in the liquid.

The heat transfer rates: hi, of the heat-accumulating microcapsule dispersions obtained in the manners described above, relative to the Reynolds number: Re, are shown in FIGS. 6 through 8.

Figure 6:
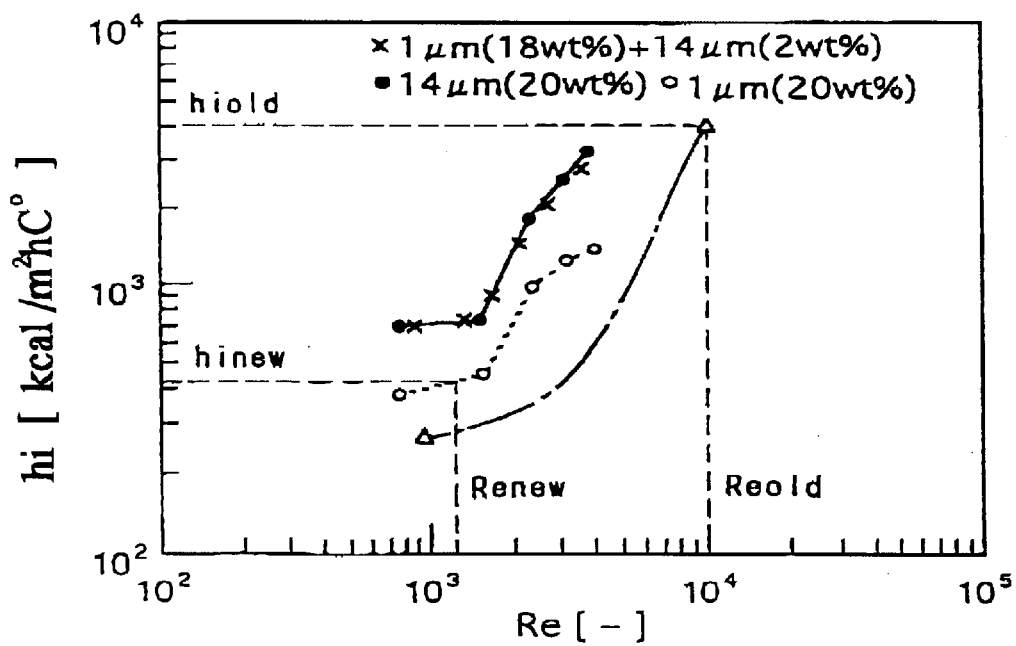
FIG. 6 is a graph showing relationship between the Reynolds number and the heat transfer rate.

In FIG. 6, the cross mark 'x' represents the first embodiment; the black round dot solid line denotes the large-diameter capsule dispersion; and the white round dot broken line represents the small-diameter capsule dispersion corresponding to the conventional art. Further, the triangular chain dotted line represents water per se. As may be understood from this figure, there is achieved distinct improvement in the heat transfer rate: hi, for a same Reynolds number: Re.

Figure 7:
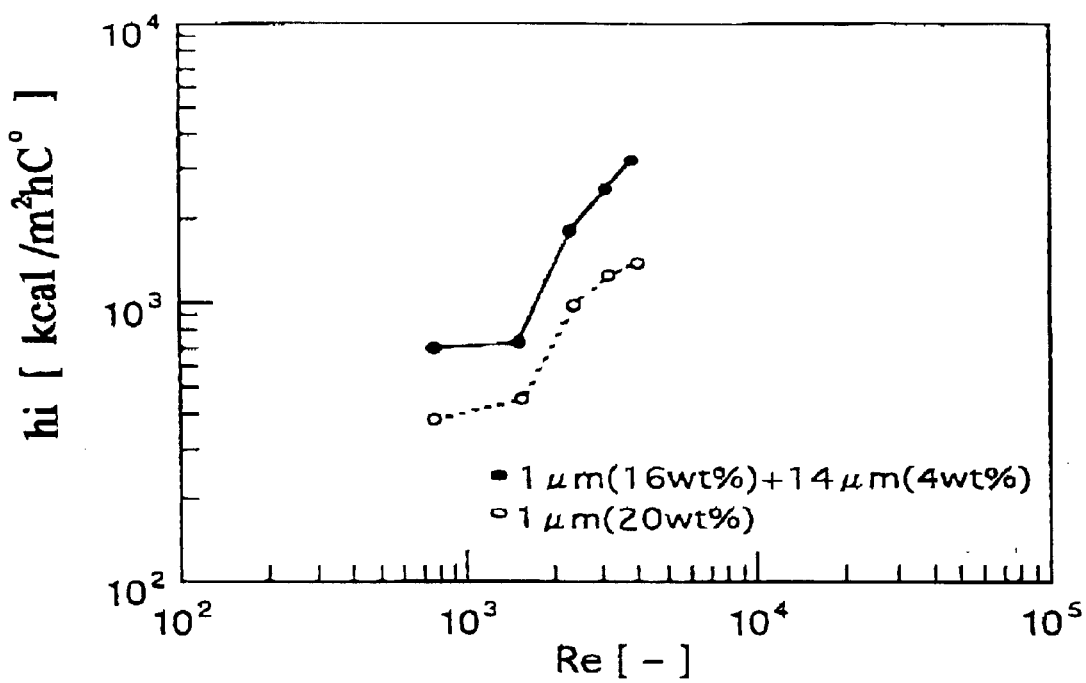
FIG. 7 is another graph showing relationship between the Reynolds number and the heat transfer rate.

FIG. 7 corresponds to FIG. 6. In this FIG. 7, the black round dot solid line represents the second embodiment; the white round dot broken line represents the small-diameter capsule dispersion corresponding to the conventional art. As may be seen from this figure, there is achieved distinct improvement in the heat transfer rate: hi, for a same Reynolds number: Re.

Figure 8:
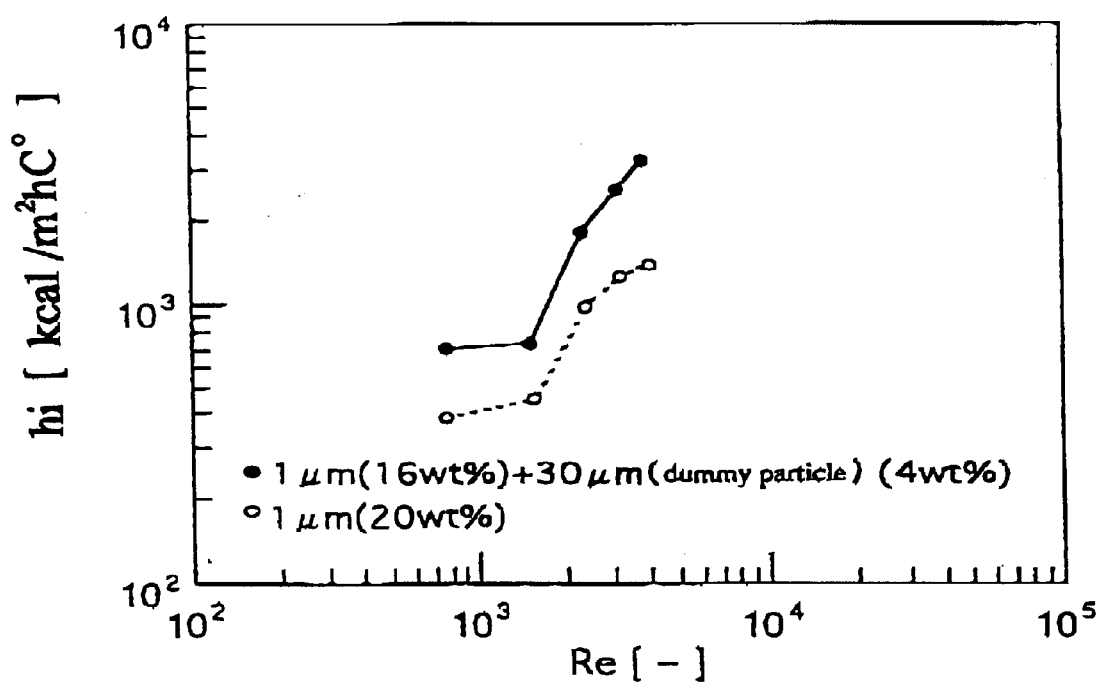
FIG. 8 is still another graph showing relationship between the Reynolds number and the heat transfer rate.

FIG. 8 too corresponds to FIG. 6. In this FIG. 8, the black round dot solid line represents the third embodiment; the white round dot broken line represents the small-diameter capsule dispersion according to the conventional air. In this case too, there is achieved distinct improvement in the heat transfer rate: hi, for a same Reynolds number: Re.

Next, the embodiments of the heat-accumulating materials used in the embodiment will be described in connection with a comparison example.

Incidentally, the solidifying points, the melting heat amounts described in the embodiments were measured by using a differential calorimeter (DSC-7 type, manufactured by Perkin Elmer Co., Ltd. USA). The melting point and the solidifying point respectively are peak temperatures at the time of heat absorption and heat generation. The 'temperature range' denotes the range between the start and end of melting or solidifying process. Also, the melting heat amount and solidifying heat amount denote the heat amounts per absolute dry unit weight of the microcapsules at 5 to 13° C.

[Example 1]

To 20 g of melamine powder, 26 g of 37% aqueous solution of formaldehyde and 50 g of water were added to adjust pH to 8. Then, the resultant mixture solution was heated to about 70° C., whereby initial condensation aqueous solution of melamine-formaldehyde was obtained. Separately, to 100 g of sodium salt aqueous solution of 5% styrene-maleic anhydride copolymer adjusted to pH 4.5, mixture liquid obtained by dissolving 4 g of stearyl alcohol as de-supercooling agent in 40 g of pentadecane and 40 g of hexadecane was added under violent stirring, thereby to effect emulsification until the volume average particle diameter of 2 μm was obtained.

To this emulsified liquid, the entire amount of the above-described initial condensation aqueous solution of melamine-formaldehyde was added and stirred together at 70° C. for 2 hours. Then, the mixture was adjusted to pH 9 with 20% caustic soda aqueous solution, whereby microcapsule dispersion containing the heat-accumulating material was obtained. Table 1 shows results of measurements of melting and solidifying conditions of the resultant microcapsule dispersion as measured by the differential calorimeter.

[Example 2]

For obtaining heat-accumulating material, into mixture of 16 g of pentadecane and 64 g of hexadecane, 2 g of stearic acid as de-supercooling agent, was dissolved, and then this mixture was subjected to the same encapsulating process as the embodiment 1, whereby microcapsule dispersion was obtained. Table 1 shows results of measurements of melting and solidifying conditions of the resultant microcapsule dispersion as measured by the differential calorimeter.

[Example 3]

For obtaining heat-accumulating material, into mixture of 56 g of pentadecane and 24 g of hexadecane, 2 g of stearic acid amide as de-supercooling agent, was dissolved, and then this mixture was subjected to the same encapsulating process as the example 1, whereby microcapsule dispersion was obtained. Table 1 shows results of measurements of melting and solidifying conditions of the resultant microcapsule dispersion as measured by the differential calorimeter.

[Control Examples 1 Through 6]

The control example heat-accumulating compositions shown in Table 1 were subjected to the same encapsulating process as the Example 1.

Table 1 shows the measured melting and solidifying points as well as the amounts of melting and solidifying heat which may be accumulated at 5 to 13° C. of these compositions.

As may be apparent from the results shown in Table 1, by using the microcapsule dispersions containing the mixture of the pentadecane and hexadecane as the cold heat transfer medium in accordance with the embodiments of the invention, there may be obtained cold heat transfer microcapsule dispersion which can be completely melted or frozen at the desirable temperature range of 5 to 13° C. of which is capable of accumulating melting or solidifying heat amount of more than 30 kcal/kg at this desirable temperature range.

On the other hand, in the case of the heat-accumulating material compositions of the control samples, the melting or solidifying points significantly deviate from the desirable temperature range. Then, these are not suitable as latent heat transfer medium.

The invention may be embodied in other specific forms without departing from the spirit or essential characteristics thereof. The present embodiments are therefore to be considered in all respects as illustrative and not restrictive, the scope of the invention being indicated by the appended claims rather than the foregoing description and all changes which come within the meaning and range of equivalency of the claims are therefore intended to be embraced therein.

TABLE 1

| example | heat-accumulating material composition (melting point) | | mixing ratio | melting point (temp. range) ° C. | solidifying point (temp. range) ° C. | melting heat amount solidifying heat amount kcal/kg |
|---|---|---|---|---|---|---|
| example 1 | hexadecane | pentadecane | 5:5 | 11.1 (8.2~13.7) | 9.5 (7.4~11.1) | 41 42 |
| example 2 | hexadecane | pentadecane | 8:2 | 12.8 (11.2~17.9) | 11.8 (9.8~14.6) | 32 38 |
| example 3 | hexadecane | pentadeeane | 3:7 | 10.7 (9.2~12.8) | 7.6 (5.2~8.8) | 37 38 |
| control example 1 | — | pentadecane | 0:10 | 8.0 (5.1~11.3) | 6.2 (3.9~8.2) | 26 14 |
| control example 2 | hexadecane | — | 10:0 | 16.7 (15.1~21.3) | 15.0 (9.5~15.5) | 0 49 |
| control example 3 | pentadecane | paraffin wax (60° C.) | 5:5 | 8.5 (5.5~16.3) | 5.5 (4.2~10.5) | 25 23 |
| control example 4 | hexadecane | tetradecane | 9:1 | 11.1 (1.2~13.4) | 9.5 (3.3~14.5) | 18 21 |
| control example 5 | hexadecane | dodecane | 9:1 | 15.2 (4.7~19.1) | 10.1 (8.3~16.4) | 23 25 |
| control example 6 | pentadecane | palmitic acid metyl | 5:5 | 7.5 (2.8~13.5) | 3.2 (1.6~92) | 12 6 |

What is claimed is:

1. A heat-accumulating microcapsule dispersion comprising:
    a plurality of small-diameter heat-accumulating microcapsules each including a small diameter microcapsule shell and an organic compound accommodated within said small diameter microcapsule shell so as to function as a heat-accumulating material by means of a solid-liquid phase change thereof, said small-diameter heat-accumulating microcapsules having a volume average particle diameter of 1 to 5 μm;
    a heat transfer fluid medium holding said plurality of small-diameter heat-accumulating microcapsules stably dispersed therein; and
    a plurality of large-diameter thermal boundary layer stirring particles dispersed in said heat-transfer fluid medium together with said small-diameter heat-accumulating microcapsules, the particles having a volume average particle diameter between 0.1 and 1.9 times the thickness of a thermal boundary layer formed inside a heat exchanging passage through which the dispersion is caused to flow, the particles stirring the thermal boundary layer by means of movement thereof inside the heat exchanging passage, wherein said small-diameter heat-accumulating microcapsules and said large-diameter thermal boundary layer stirring particles are mixed in a ratio between 49:1 to 1:1.

2. The heat-accumulating microcapsule dispersion of claim 1, wherein said large-diameter thermal boundary layer stirring particles comprise large-diameter heat-accumulating microcapsules each comprising a large-diameter microcapsule shell and an organic compound accommodated within said large-diameter shell so as to function as heat-accumulating material by means of a solid-liquid phase change thereof.

3. The heat-accumulating microcapsule dispersion of claim 1, wherein said large-diameter thermal boundary layer stirring particles comprise at least one organic compound selected from the group consisting of melamine resin particles, urea resin particles, polyethylene particles, carbon powder, and wheat flour.

4. The heat-accumulating microcapsule dispersion of claim 1, wherein the organic compound accommodated within said small-diameter microcapsule shell comprises an aliphatic hydrocarbon compound.

5. The heat-accumulating microcapsule dispersion of claim 4, wherein said aliphatic hydrocarbon compound comprises a mixture of hexadecane and pentadecane.

6. The heat-accumulating microcapsule dispersion of claim 5, wherein said small-diameter microcapsule shell further accommodates a de-supercooling material having a melting point of 40° C. or higher.

7. The heat-accumulating microcapsule dispersion of claim 5, wherein the ratio of said hexadecane to said pentadecane ranges between 8:2 and 1:9.

8. A heat-accumulating microcapsule dispersion comprising:
- a plurality of small-diameter heat-accumulating microcapsules each including a microcapsule shell and an organic compound accommodated within the microcapsule shell so as to function as heat-accumulating material by means of a solid-liquid phase change thereof, said plurality of small-diameter heat-accumulating microcapsules having a volume average particle diameter of 1 to 5 μm;
- a heat-transfer fluid medium having said plurality of microcapsules stably dispersed therein; and
- a plurality of large diameter thermal boundary layer stirring particles dispersed in said heat-transfer fluid medium, the particles being prepared separately from said small-diameter heat-accumulating microcapsules so as to obtain a volume average particle diameter greater than 5 μm and smaller than 100 μm;
- wherein the ratio of said small-diameter heat-accumulating microcapsules to said large-diameter thermal boundary layer stirring particles ranges between 49:1 to 1:1.

9. The heat-accumulating microcapsule dispersion of claim 8, wherein said large-diameter thermal boundary layer stirring particles comprise large-diameter heat-accumulating microcapsules each comprising a large-diameter microcapsule shell and an organic compound accommodated within said large diameter microcapsule shell so as to function as heat-accumulating material by means of a solid-liquid phase change thereof.

10. The heat-accumulating microcapsule dispersion of claim 8, wherein said large diameter thermal boundary layer stirring particles comprise at least one organic compound selected from the group consisting of melamine resin particles, urea resin particles, polyethylene particles, carbon powder, and wheat flour.

11. The heat-accumulating microcapsule dispersion of claim 8, wherein said organic compound accommodated within said small-diameter microcapsule shell comprises an aliphatic hydrocarbon compound.

12. The heat-accumulating microcapsule dispersion of claim 11, wherein said aliphatic hydrocarbon compound comprises a mixture of hexadecane and pentadecane.

13. The heat-accumulating microcapsule dispersion of claim 12, wherein said small-diameter microcapsule shell further accommodates a de-supercooling material having a melting point of 40° C. or higher.

14. The heat-accumulating microcapsule dispersion of claim 12, wherein the ratio of hexadecane to pentadecane ranges between 8:2 and 1:9.

15. A heat-accumulating microcapsule dispersion comprising:
- a plurality of microcapsules each including a microcapsule shell and an organic compound accommodated within said shell so as to function as a heat-accumulating material by means of a solid-liquid phase change thereof, said microcapsules having a volume average particle diameter of 1 to 5 μm;
- a heat-transfer fluid medium holding said plurality of microcapsules stably dispersed therein; and
- wherein said heat-accumulating microcapsules as dispersed in said heat-transfer fluid medium have the first particle-diameter peak from 1 to 5 μm and the second particle-diameter peak is greater than 5 μm and smaller than 100 μm, said second particle-diameter peak having a peak height not exceeding that of the first particle-diameter peak.

16. The heat-accumulating microcapsule dispersion of claim 15, wherein said organic compound accommodated within said microcapsule shell comprises an aliphatic hydrocarbon compound.

17. The heat-accumulating microcapsule dispersion of claim 16, wherein said aliphatic hydrocarbon compound comprises a mixture of hexadecane and pentadecane.

18. The heat-accumulating microcapsule dispersion of claim 17, wherein said microcapsule shell further accommodates a de-supercooling material having a melting point of 40° or higher.

19. The heat-accumulating microcapsule dispersion of claim 17, wherein the ratio of said hexadecane to said pentadecane ranges between 8:2 and 1:9.

* * * * *